Oct. 11, 1966  F. NICOLETTA  3,277,573
HEAVY DUTY SHEARS
Filed April 29, 1964  2 Sheets-Sheet 2
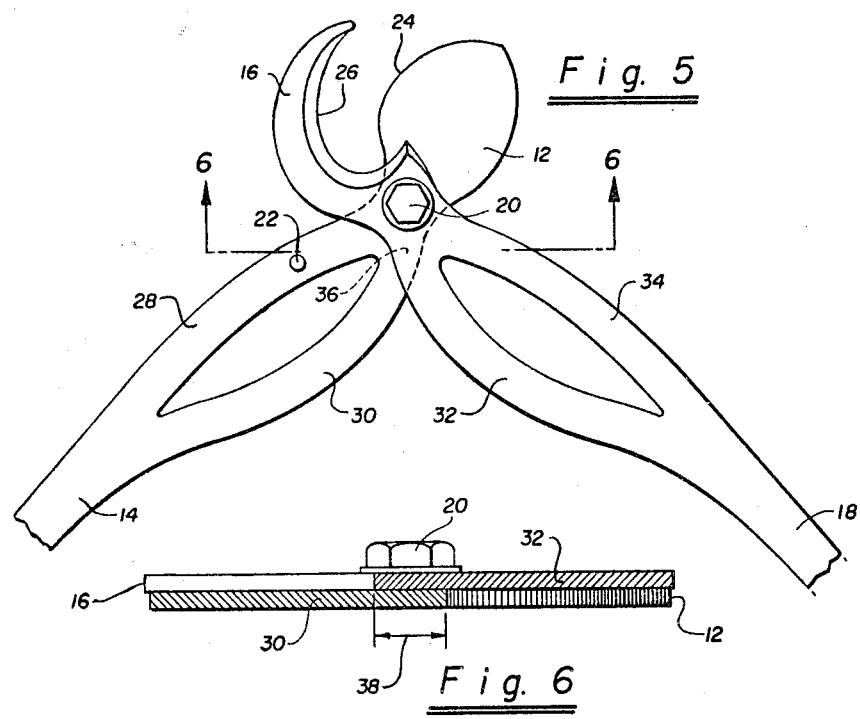
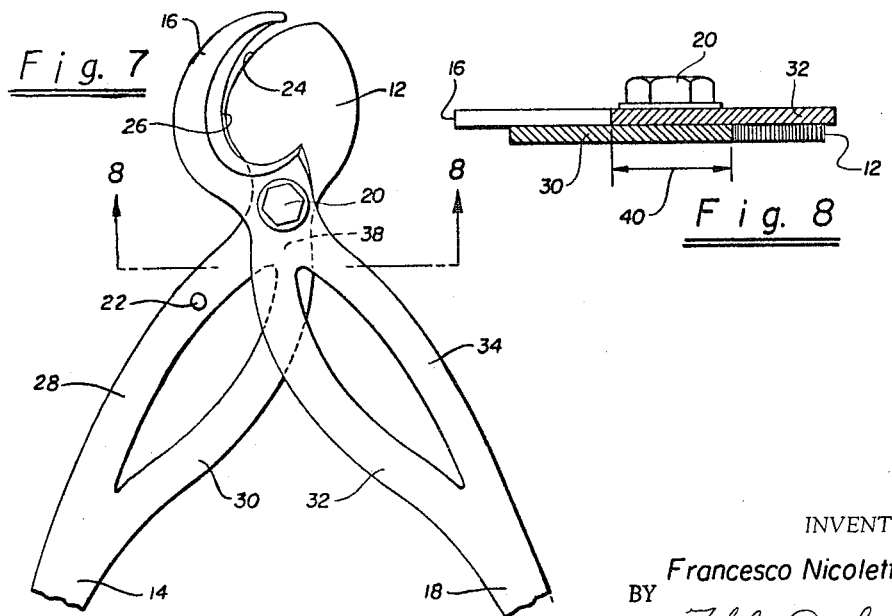
INVENTOR.
Francesco Nicoletta
BY
Attorneys

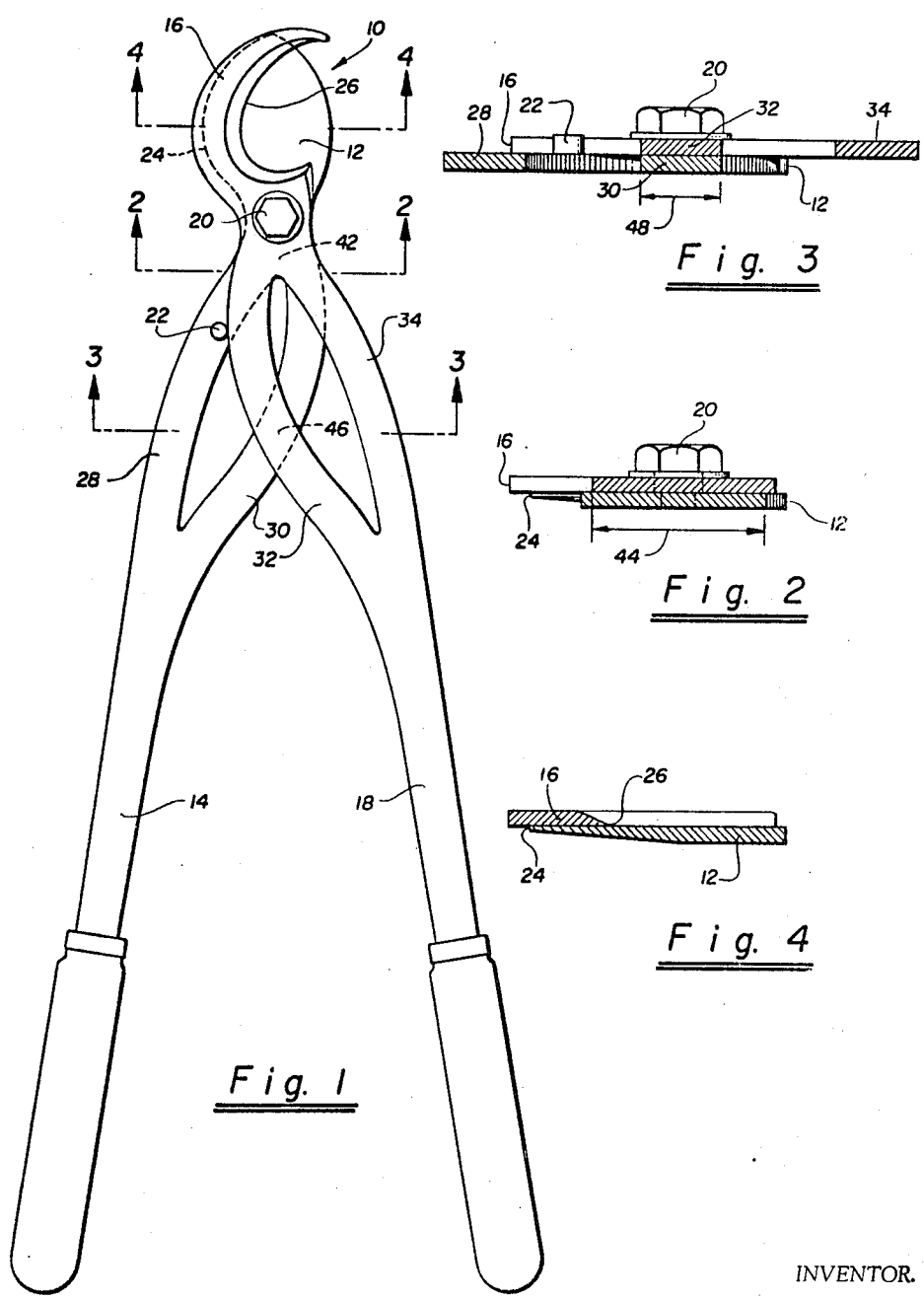

United States Patent Office 3,277,573
Patented Oct. 11, 1966

3,277,573
HEAVY DUTY SHEARS
Francesco Nicoletta, 115 Clayton St.,
San Rafael, Calif.
Filed Apr. 29, 1964, Ser. No. 363,509
4 Claims. (Cl. 30—254)

This invention relates generally to cutting devices, and more particularly to pruning shears and the like adapted to heavy duty cutting operations.

Cutting devices, such as pruning shears, have commonly employed crossed and pivoted blades to provide a scissors action. Lugs are provided to arrest the cutting action. While devices of this type have been in widespread use for many years, they have not been entirely satisfactory. For one thing, the shears are unable to resist the lateral stresses normally encountered in the use of the pivoted cross members, particularly when cutting tough flexible materials such as green branches, vines, etc. The cross scissors action also tends to rotate the shear blades, or the material being cut, so that the latter becomes wedged between the blades. As the shear blades are spread apart, more of the material passes between the blades and thereby increases the wedging or camming effect. The ultimate result is to provide a certain amount of play about the pivot member (both longitudinal and torsional) so that the material either passes between the blades or the shear blades become so displaced that efficient cutting becomes impossible. This problem becomes intensified when the material being cut (e.g., vine or limb) is of a different diameter than that for which the shears were designed.

In general, it is an object of the present invention to improve upon the construction of cutting devices of the type described, particularly with respect to means resisting the spreading apart or twisting of the cutting blades due to wedging or camming effects of the material being cut.

It is another object of this invention to provide an improved cutting device of such character wherein shear blades are forced into cutting contact with each other at all times during the cutting stroke.

Another object of the invention is to provide improved pruning shears of this type characterized by an increased strength of the blade support arms without increase in weight.

Another object of the invention is to provide improved cutting shears of such character which are less cumbersome in design and more easily manufactured.

Additional objects and advantages of the invention will appear from the following description and from the drawings, in which:

FIGURE 1 is a plan view of a cutting device incorporating the present invention;

FIGURE 2 is an enlarged view along the line 2—2 of FIGURE 1;

FIGURE 3 is a like view along the line 3—3 of FIGURE 1;

FIGURE 4 is a like view along the line 4—4 of FIGURE 1;

FIGURE 5 is a fragmentary view similar to FIGURE 1, showing the cutting device in open position;

FIGURE 6 is an enlarged view along the line 6—6 of FIGURE 5;

FIGURE 7 is a fragmentary view similar to FIGURE 5, showing the cutting device just prior to the end of the cutting stroke; and FIGURE 8 is an enlarged view along the line 8—8 of FIGURE 7.

Generally stated, the present invention is directed to cutting devices, such as pruning shears, wherein a pair of shear blades are provided on one side of a connecting pivot and extending handle portions are provided on the other side of the pivot. In accordance with the present invention, each of the handle portions includes an elongate planar section which presents a progressively increasing transverse dimension along the length of the handle portions, in a direction extending away from the pivot. In a preferred embodiment, these planar handle sections can be constructed in the form of arcuate spaced apart members, joined at their ends, thereby permitting a desirable reduction in weight and in the cost of fabricating the shear members. This described construction provides the advantage during a cutting stroke, of a progressively increasing area of contact between handle sections. More specifically, it insures that such area of contact will increase in both transverse and longitudinal dimension, as well as in size, during the cutting stroke. The net effect is to cause the planar handle portions to effectively resist spreading apart of the shear blades, due to longitudinal and torsional twisting, as the latter slide across one another to effect cutting.

The present invention also contemplates the use of cooperating shear blades adapted to resist or minimize the wedging or camming effect tending to twist or spread the shear blades apart. In a preferred embodiment, these shear blades include cooperating concave and convex cutting surfaces, one in the form of an enlarging spiral and the other in the form of a smooth relatively uniform arc. This construction has been found to provide a rapidly enlarging cutting front which increases to a maximum near the end of the cutting stroke. The cutting device of the invention thus provides a cutting mechanism wherein the resistance to twisting and spreading apart of the shear blades increases substantially in proportion to the increase in the cutting front presented to the material being cut.

Referring to the drawings in detail, 10 generally designates a pair of pruning shears comprising a first cutting member including a shear blade 12 and integral handle portion 14 and a second cutting member including a shear blade 16 and integral handle portion 18. The separate cutting members are connected in conventional manner by means of a pivot bolt 20 which permits the handle portions to be manipulated to slide the shear blades across one another in a cutting stroke. A lug 22 is provided on the inner surface of at least one of the cutting members to arrest the cutting stroke (see FIGURES 1 and 3).

As best seen in FIGURES 5 and 7, the cutting edges of the shear blades are constructed to provide a rapidly increasing cutting front in engagement with the material being cut, approaching a maximum near the end of the cutting stroke. This is achieved by the provision of smooth convex cutting edge 24 on the shear blade 12 and the provision of a cooperating concave cutting edge 26 on the blade 16 in the form of an enlarging spiral extending outward from the pivot 20. These cutting edges tend to present a relatively small cutting front during the initial stages of the cutting stroke (FIGURE 5). However, during the final stages of the cutting stroke (FIGURE 7), the cutting edges 24 and 26 are in substantial parallelism along their length and consequently present a relatively large cutting front.

It is a particular feature of the present invention that the handle portions extending away from the pivot 20 present elongate planar surfaces of progressively increasing transverse dimension. In the illustrated embodiment this feature is provided by a pair of spaced apart arcuate sections or legs 28 and 30, on the lower handle portion 14, and by a cooperating pair of legs 32 and 34, on the upper handle portion 18. In a preferred construction, the inner surface of each leg or intermediate handle portion is carefully machined or cast to be in the same plane as the inner surface of the attached shear blade. This construction insures that the contacting surfaces of the shear blades and intermediate handle portions all slide across one another in substantially the same plane.

In an open position of the shear blades, represented in FIGURE 5, a relatively small area of contact is presented between the separate cutting members. This area of contact is represented at 36 in FIGURE 5, and by the transverse dimension 38 in FIGURE 6. During the cutting stroke, this area of contact progressively increases, as represented at 39 in FIGURE 7, and by the transverse dimension 40 in FIGURE 8. Upon completion of the cutting stroke (FIGURE 1) the transverse dimension of the area of contact between the cutting members increases to a maximum, as generally represented at 42 in FIGURE 1, and by the dimension 44 in FIGURE 2.

This increase in the transverse dimension of the contact is particularly effective in preventing twisting or torsional play of the cutting members about the pivot point 20.

During the cutting stroke, the contacting planar surface of the intermediate handle portions also increases in size or dimension in a direction extending along the length of the handles. This result can be seen by comparing the longitudinal dimensions of the zones of contact 36 and 38 in FIGURES 5 and 7. This effect is also achieved by the additional zone of contact, represented at 46 in FIGURE 1, and the dimension 48 in FIGURE 3, achieved during the final stages of the cutting operation. The increase in the longitudinal dimensions of the areas of contact between the members is particularly effective in reducing longitudinal warping or play of the cutting members about the pivot bolt 20.

From the foregoing it should be apparent that the present invention makes possible cutting operations wherein the area of contact between the respective planar surfaces of the intermediate handle portions increases in size as the shear blades 12 and 16 slide across one another during the cutting stroke. This increase in size is both in a transverse and in a longitudinal direction. The increase in transverse dimension tends to stabilize the cutting device and the shear blades against wedging or camming effects tending to twist the separate cutting members about their own axes (i.e., due to increased resistance to play about the pivot). The increase in longitudinal dimension similarly tends to stabilize the shear blades against wedging or camming effects tending to spread the blades in a scissors motion normal to the plane of the shear blades (i.e., due to increased resistance of the handle portions to spreading or warping in a longitudinal direction). The net effect is a very stable cutting action in which the contacting handle portions, represented by the legs 28, 30, 32 and 34, cooperate to force the shear blades into close cutting contact at all times during the cutting stroke. The shear blades are thus enabled to resist the large lateral stresses frequently encountered in the cutting of tough, flexible, green materials, which heretofore have caused the shear blades to twist or spread apart and thereby provide ineffective cutting.

To those skilled in the art to which this invention relates, many changes in construction and differing embodiments and applications of the invention will suggest themselves without departing from the spirit and scope of the invention. For example, the intermediate handle portions may be constructed as solid planar sections instead of the spaced apart arcuate sections illustrated in the drawings, although best results are generally obtained with the illustrated apparatus due to the relatively light weight of this construction. In addition, the device of the invention can be easily adapted to cutting and pruning operations of relatively tall trees, wherein use is made of handle extensions ranging from 8 to 15 feet in length. As is well known, such devices employ various means such as ropes and the like so as to manipulate one of the handles. Accordingly, it should be understood that the disclosure and description herein are essentially illustrative and are not intended to be in any sense limiting.

I claim:

1. In a heavy duty pruning shear tool having cooperating blades subject to being forced apart from shearing contact as they close by material wedging between the blades, a pair of members each having a cutting blade at one end and a handle at the other end, said members adapted to cross each other at a region intermediate the ends, pivot means connecting the members at said region so that as the handles are brought together the blades close, said cutting blades including cooperating shearing portions which are spaced and opposed when the blades are opened and which shear and overlap as the blades are closed, said handle portions adjacent said pivot means including means defining surfaces adapted to cooperatively slide across each other and in contact as the tool is operated, each of said means defining surfaces including inner and outer legs joined together near the pivot means and providing a progressively larger area of transverse contact therebetween as the blades are closed to thereby resist that component of the forces tending to force the blades apart torsionally with respect to an imaginary line bisecting the tool through the pivot means and between the handles, the inner leg of one handle crossing the inner leg of the other handle and making sliding contact along the same so that as the blades are closed the point of contact between the legs moves away from the pivot means and along said imaginary line to thereby resist that component of the force tending to force the blades apart longitudinally with respect to said imaginary line so that as the moment of the relatively fixed radius wedging force increases, the inner legs of each of the handle portions are more tightly pressed together to resist such force moment and furthermore the effective radius of the resisting moment from the point of contact to the pivot means increases substantially as the blades are closed.

2. A shear tool as in claim 1 in which the blades are constructed to present a larger and larger cutting front to each other as the blades are closed.

3. A cutting device as in claim 1 wherein said shear blades present cooperating cutting surfaces, one in the form of an enlarging spiral concavity extending outward from said pivot member and the other in the form of a smooth convex arc curving uniformly outward from said pivot member.

4. A tool as in claim 1 in which one of said members includes a shear blade in the form of an interior enlarging spiral extending outward from a pivot aperture provided therein and an integral handle portion extending away from said shear blade on the opposite side of said pivot aperture, said handle portion including a pair of arcuate elongate spaced apart sections presenting a planar surface of progressively increasing transverse dimension along the length of said handle portion; and in which the other member includes a second shear blade in the form of a smooth exterior arc curving uniformly outward from a second pivot aperture provided therein and a second integral handle portion extending away from said last named shear blade on the opposite side of said second pivot aperture, said second handle portion likewise including a pair of arcuate elongate spaced apart sections presenting a planar surface of progressively increasing transverse dimension along the length thereof.

References Cited by the Examiner

UNITED STATES PATENTS

| 225,798 | 3/1880 | Cline | 30—259 |
| 643,539 | 2/1900 | Rowe | 30—256 |
| 1,814,821 | 7/1931 | Botts | 30—261 |

WILLIAM FELDMAN, *Primary Examiner.*

J. C. PETERS, *Assistant Examiner.*